United States Patent
Kim et al.

(10) Patent No.: US 8,187,355 B2
(45) Date of Patent: May 29, 2012

(54) FILTER ASSEMBLY FOR VACUUM CLEANER

(75) Inventors: Tak-Soo Kim, Gwangju (KR);
Young-Jun Cho, Gwangju (KR);
Kyong-Hui Jeon, Seosan-si (KR)

(73) Assignee: Samsung Electronics Co., Ltd., Gwangju-si (KR)

( * ) Notice: Subject to any disclaimer, the term of this patent is extended or adjusted under 35 U.S.C. 154(b) by 330 days.

(21) Appl. No.: 12/584,224

(22) Filed: Sep. 2, 2009

(65) Prior Publication Data
US 2010/0126129 A1 May 27, 2010

(51) Int. Cl.
*B01D 46/00* (2006.01)
(52) U.S. Cl. ............... 55/502; 55/494; 55/497; 55/499; 55/501; 55/DIG. 3; 55/DIG. 31
(58) Field of Classification Search ............ 55/494, 55/499, 501, 502, DIG. 3, DIG. 31, 497
See application file for complete search history.

(56) References Cited

U.S. PATENT DOCUMENTS

| | | | |
|---|---|---|---|
| 4,334,899 A | 6/1982 | McConnell | |
| 6,085,382 A * | 7/2000 | Bobrosky et al. | 15/350 |
| 6,217,627 B1 * | 4/2001 | Vyskocil et al. | 55/492 |
| 6,231,630 B1 * | 5/2001 | Ernst et al. | 55/385.3 |
| 6,361,587 B1 * | 3/2002 | Rohn et al. | 95/218 |
| 6,875,255 B2 * | 4/2005 | Alford et al. | 95/273 |
| 7,144,438 B2 * | 12/2006 | Lee et al. | 55/429 |
| 7,247,182 B2 * | 7/2007 | Boyer et al. | 55/429 |
| 2001/0015132 A1 | 8/2001 | Rohn et al. | |
| 2003/0208878 A1 | 11/2003 | Alford et al. | |
| 2005/0071946 A1 | 4/2005 | Hafling et al. | |
| 2007/0209146 A1 * | 9/2007 | Mersmann et al. | 15/347 |
| 2009/0301046 A1 * | 12/2009 | Felber et al. | 55/502 |

FOREIGN PATENT DOCUMENTS

| | | |
|---|---|---|
| CN | 1600240 | 3/2005 |
| DE | 10211649 | 9/2003 |
| KR | 1020000060330 | 10/2000 |
| KR | 1020060112492 | 11/2006 |
| KR | 1020070065136 | 6/2007 |
| WO | WO2004/098368 | 11/2004 |

OTHER PUBLICATIONS

Extended European Search Report dated Jun. 8, 2011 correponding to European Patent Application No. 09012808.3-2316.

* cited by examiner

*Primary Examiner* — Robert Clemente
(74) *Attorney, Agent, or Firm* — Ohlandt, Greeley, Ruggiero & Perle, LLP

(57) ABSTRACT

A filter assembly for a vacuum cleaner is provided, and the filter assembly comprises a discharge grill formed on a discharge passage, a filter member mounted on the discharge grill, and a gasket member that is detachably connected between the discharge grill and the filter member and seals a space between the discharge grill and the filter member.

8 Claims, 6 Drawing Sheets

FILTER ASSEMBLY FOR VACUUM CLEANER

CROSS-REFERENCE TO RELATED APPLICATIONS

This application claims priority under 35 U.S.C. §119(a) from Korean Patent Application No. 10-2008-116394 and from Korean Patent Application No. 10-2009-29802, filed on Nov. 21, 2008 and Apr. 7, 2009 respectively, in the Korean Intellectual Property Office, the disclosures of each of which are incorporated herein by reference in their entirety.

BACKGROUND OF THE INVENTION

1. Field of the Invention

Apparatuses and methods consistent with the present disclosure relate to a filter assembly, and more particularly to a filter assembly for a vacuum cleaner formed on a discharge passage of a main body of the vacuum cleaner to ultimately filter discharged air from the vacuum cleaner.

2. Description of the Related Art

In general, a vacuum cleaner draws in air including dirt from a surface to be cleaned, separates large dirt from the air by passing the air through a dirt bag or a cyclone chamber, and finally filters fine particles included in the air using a filter assembly before discharging the filtered air outside the vacuum cleaner.

The conventional filter assembly is generally mounted on the main body of the vacuum cleaner and has a discharge grill comprising a plurality of discharge holes and a filter inserted into the discharge grill. In order to keep close contact between the filter and the discharge grill, the discharge grill and the filter are bonded with each other using adhesives such as Epoxy bond. In addition, a separate sealing material is used to stick the discharge grill to the main body of the vacuum cleaner.

Since the conventional filter assembly uses adhesives, it takes a lot of time to dry the adhesives, and it is also not easy to apply the adhesives between the discharge grill and the filter. Therefore, the overall work performance is compromised. In addition, as the sealing material is used together with the adhesives, cost of production also increases.

SUMMARY OF THE INVENTION

Exemplary embodiments of the present disclosure address at least the above problems and/or disadvantages and other disadvantages not described above. Also, the present disclosure is not required to overcome the disadvantages described above, and an exemplary embodiment of the present disclosure may not overcome any of the problems described above.

In order to resolve the above issues, the present disclosure provides a filter assembly for a vacuum cleaner that is capable of sealing two spots at the same time, namely between a discharge grill and a filter member and between the discharge grill and the main body of the vacuum cleaner, using a gasket member, and which makes it easier to assemble and maintain the filter member.

A filter assembly of a vacuum cleaner, according to an exemplary embodiment of the present disclosure, comprises a discharge grill formed on a discharge passage of a main body of the vacuum cleaner, a filter member mounted on the discharge grill, and a gasket member that is detachably formed between the discharge grill and the filter member and seals a space between the discharge grill and the filter member.

The gasket member may further comprise a sealing reinforcement unit to form a seal between the discharge grill and part of main body of the vacuum cleaner contacting the discharge grill. In this case, the gasket member and the sealing reinforcement unit may be formed of a soft rubber material or a synthetic rubber material.

The sealing reinforcement unit may press the gasket member towards the discharge grill and the filter member by receiving discharged air moving towards the discharge grill. The sealing reinforcement unit may comprise a wing unit extended and formed along one side of the gasket member and a discharge receiving groove formed between the wing unit and the gasket member to receive discharged air. In this case, the wing unit may seal a space between the discharge grill and main body of the vacuum cleaner.

The filter member may comprise a filter unit and a frame unit formed along with outer surface of the filter unit.

The gasket member may further comprise an extension unit to cover the end of the frame unit.

The gasket member may further comprise a plurality of combination protrusions to be snappingly combined to the discharge grill to sustain the filter member to the discharge grill. In this case, the plurality of combination protrusions may protrude along the outer surface of the gasket member at predetermined intervals, and a plurality of combination grooves to which the combination protrusions are snappingly combined may be formed on the discharge grill.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EXEMPLARY EMBODIMENTS OF THE INVENTION

Figure 1:
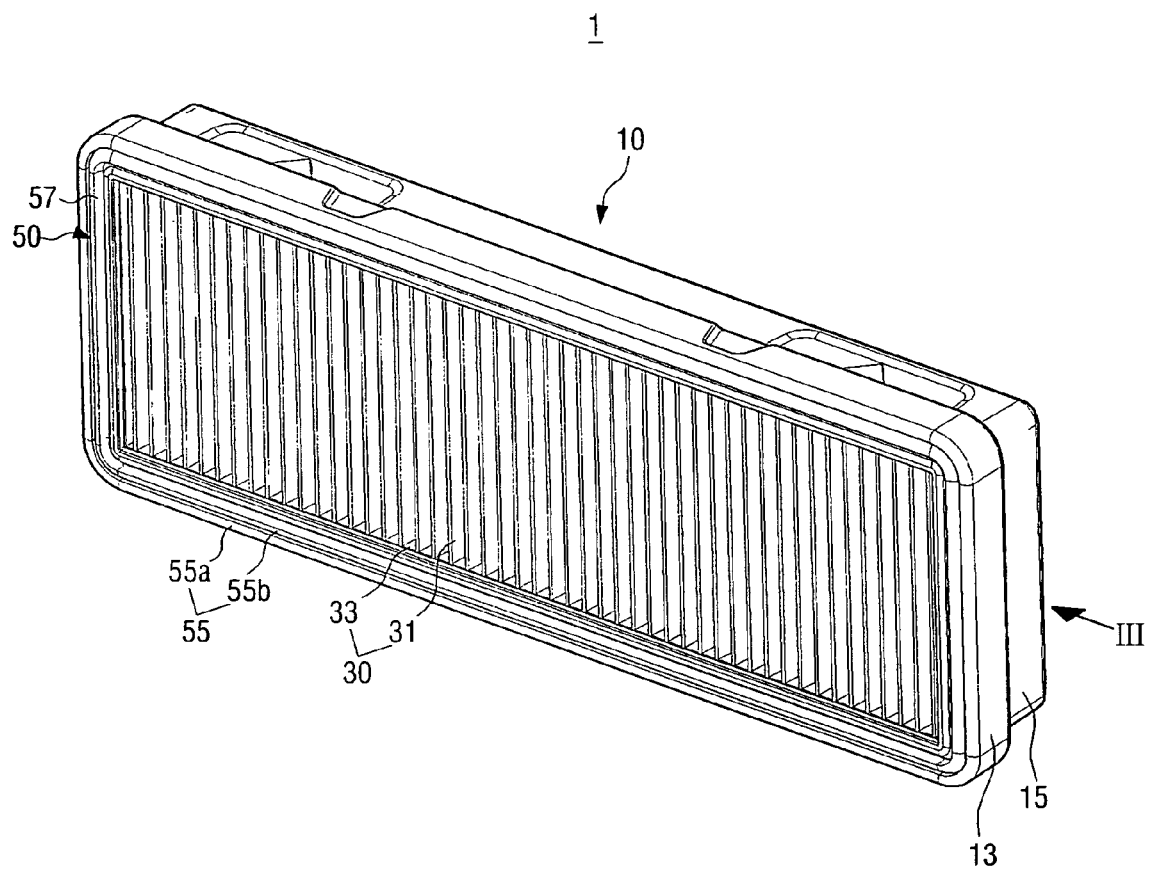
FIG. 1 is a combined perspective view of a filter assembly for a vacuum cleaner according to an exemplary embodiment of the present disclosure.

Certain exemplary embodiments of the present disclosure will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the disclosure. Thus, it is apparent that the present disclosure can be carried out without those specifically defined matters. Also, well-known functions or constructions are not described in detail since they would obscure the disclosure with unnecessary detail.

The structure of a filter assembly for a vacuum cleaner, according to an exemplary embodiment of the present disclosure, will be explained with reference to the attached drawings.

Figure 2:
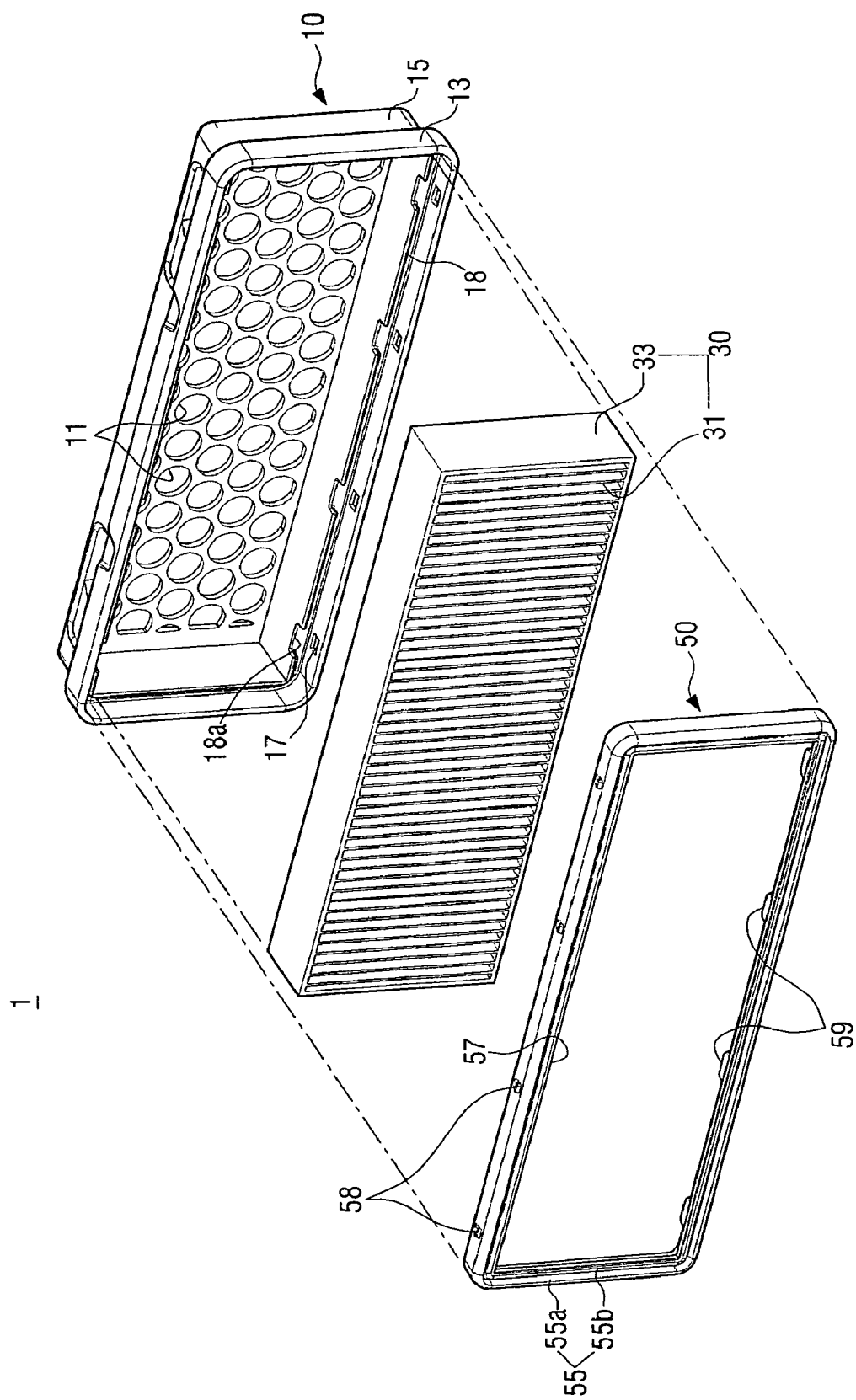
FIG. 2 is an exploded perspective view of a filter assembly for a vacuum cleaner according to an exemplary embodiment of the present disclosure.
Figure 3:
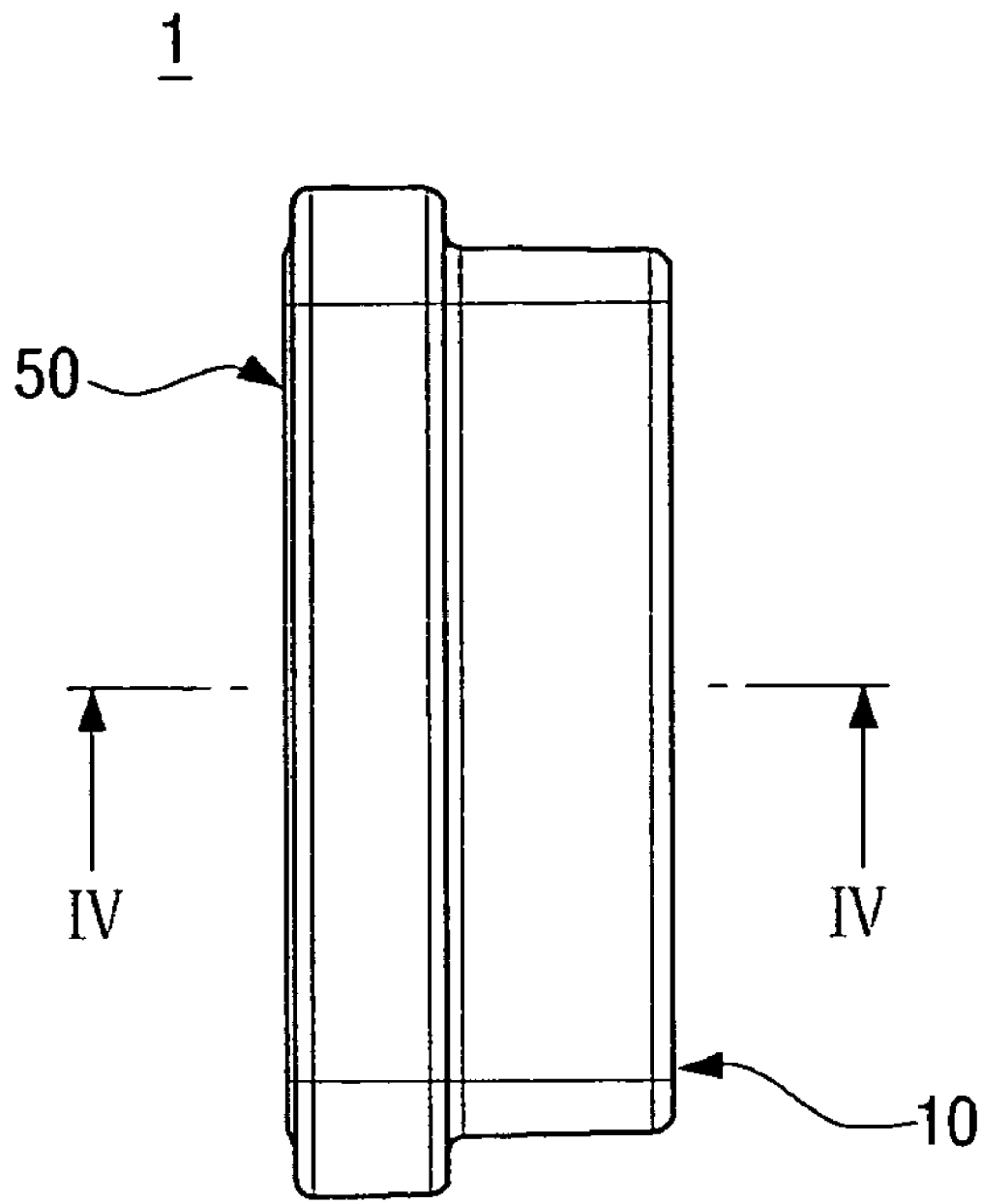
FIG. 3 is a side view of a filter assembly viewed from the direction of III in FIG. 1.
Figure 4:
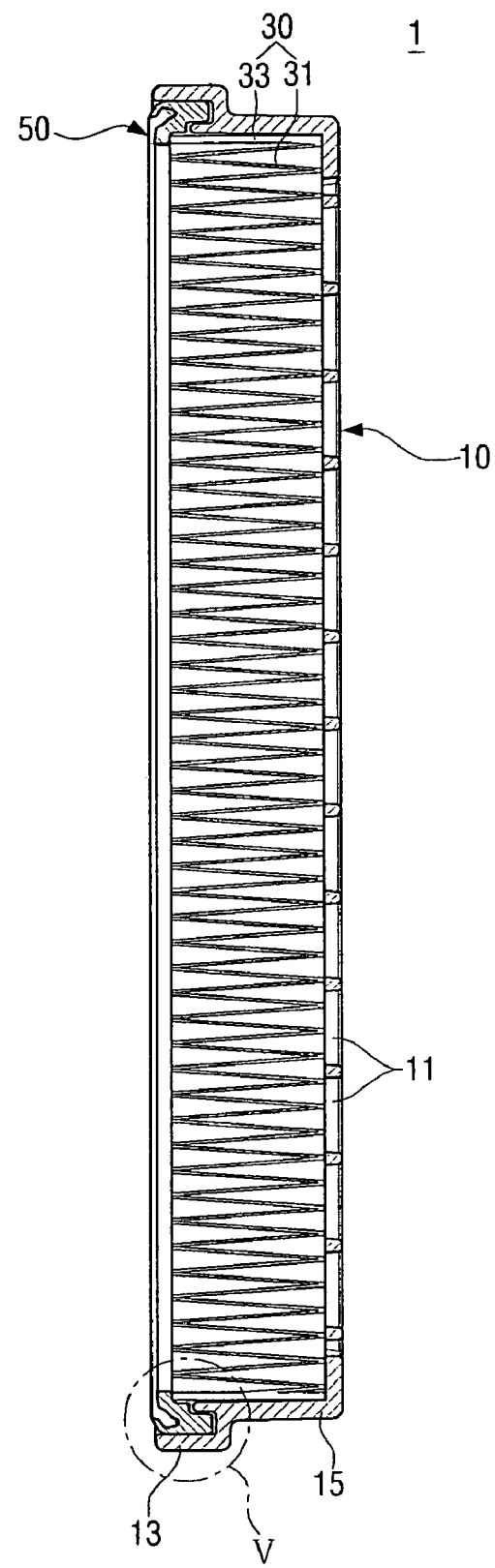
FIG. 4 is a cross-sectional view of a filter assembly cut through line IV-IV in FIG. 3.
Figure 5:
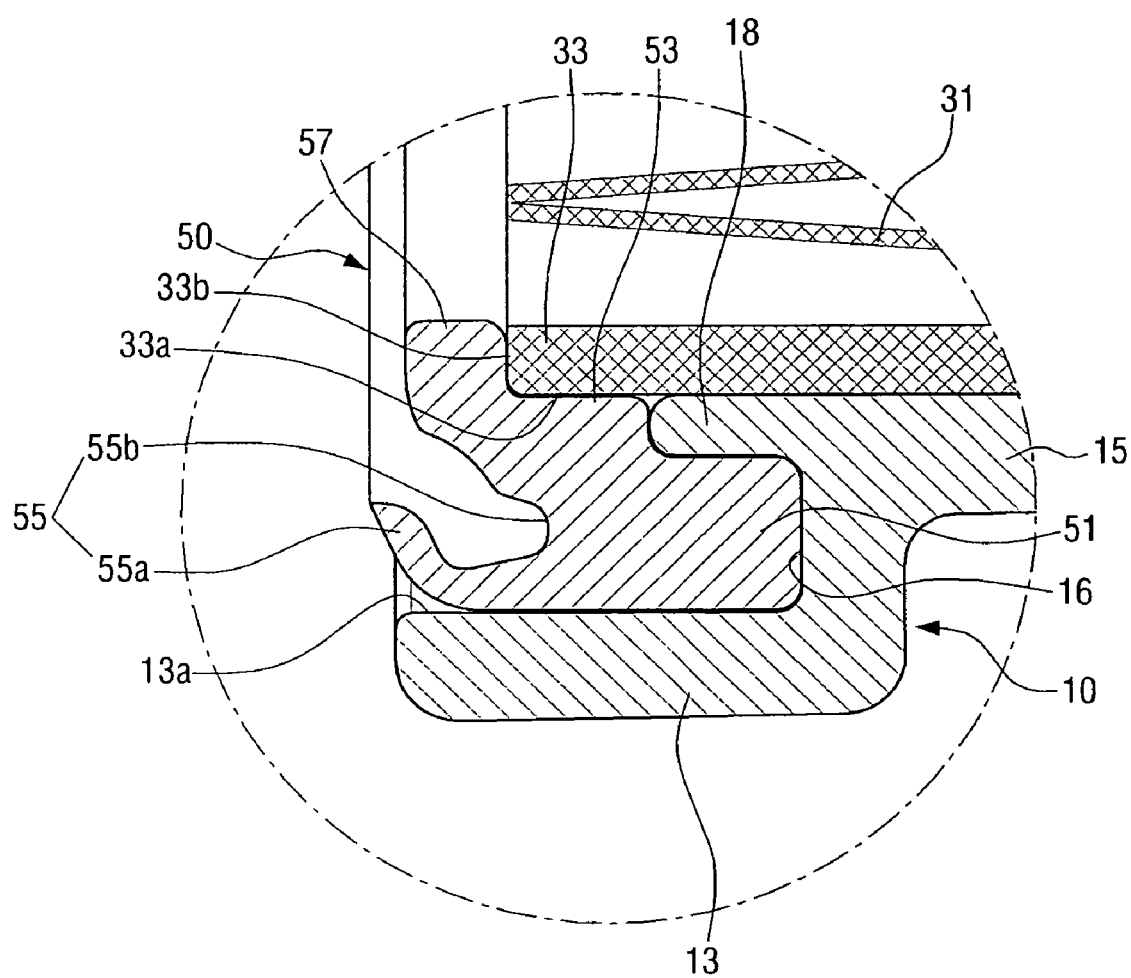
FIG. 5 is a magnified view of a filter assembly in which portion V in FIG. 4 is magnified.

FIG. 1 and FIG. 2 are a combined perspective view and an exploded perspective view of a filter assembler for a vacuum cleaner according to an exemplary embodiment of the present disclosure, respectively. FIG. 3 is a side view of a filter assembly from the direction of III in FIG. 1, and FIG. 4 is a cross-sectional view showing inside of a filter assembly cut through line IV-IV in FIG. 3. FIG. 5 is a magnified view of portion V in FIG. 4 to illustrate a sealing reinforcement unit of a gasket member.

A filter assembly 1 of the present disclosure comprises a discharge grill 10, a filter 30, and a gasket member 50.

Referring to FIG. 1 and FIG. 2, the discharge grill 10 is detachably mounted on a predetermined location of a discharge passage, which discharges air from a main body 100 of a vacuum cleaner. That is, the discharge grill 10 is mounted on one side of a mounting unit 120 of the main body of the vacuum cleaner in which a plurality of discharge holes 110 are formed (see FIG. 6). The discharge grill 10 is open so that the filter 30 can be removably attached to one side of the discharge grill 10 facing the main body of the vacuum cleaner, and has a plurality of grill holes 11 on the other side so that air passing through the filter 30 can be discharged from the filter assembly 1.

The first outer surface 13 of the discharge grill 10 includes a concave groove 16 for inserting the gasket member 50, where the first outer surface 13 protrudes more than a second outer surface 15 of the discharge grill on the other side (see FIG. 5). Combined grooves 17 are formed inside the first outer surface 13 of the discharge grill 10 at predetermined intervals, and a plurality of fixed grooves 18a are formed on a partition 18 forming a part of the concave groove 16.

The filter member 30 comprises a filter 31 and a frame unit 33. The filter 31 has a corrugated shape and is inserted into the inside the discharge grill 10 to filter fine particles included in air. The frame 33 is mounted along the outer surface of the filter 31 to prevent the filter 31 from being disfigured due to external force.

If the filter member 30 is inserted into the discharge grill 10, the upper end of the frame unit 33 is located higher than the partition 18 of the discharge grill 10 and lower than the first outer surface 13 to expand the contact area between the gasket member 50 and the frame unit 33 and thus the tightness between the two can be enhanced.

Referring to FIG. 2 to FIG. 5, the gasket member 50 is removably attached between the discharge grill 10 and the filter member 30, and forms a seal between the discharge grill 10 and the filter member 30.

The gasket member 50 has a loop shape and is formed of a soft rubber material or a synthetic rubber material. The gasket member 50 comprises an insertion unit 51 that is removably inserted along the concave groove 16 of the discharge grill 10 and forms a multi-layered contact area 53 contacting the partition 18 of the discharge grill 10 and one side 33a of the frame unit 33 on one side of the gasket member 50 as illustrated in FIG. 5.

The gasket member 50 includes a protrusion unit 57 that extends from the multi-layered contact area 53 so as to cover the end 33b of the frame unit 33. The protrusion unit 57 expands the contact area with the frame unit 33 together with the multi-layered contact area 53, and thus may enhance the tightness between the partition of the discharge grill 10 and the frame unit 33 of the filter member 30.

The gasket member 50 comprises a sealing reinforcement unit 55 on the opposite side of the insertion unit 51. The sealing reinforcement unit 55 comprises a wing unit 55a extended and formed along the one side of the gasket member 50 and a discharge receiving groove 55b that is formed between the wing unit 55a and the gasket member 50 to receive part of air discharged from inside the main body of the vacuum cleaner.

The gasket member 50 also comprises a plurality of fixed protrusions 59 inserted into the plurality of fixed grooves 18a of the discharge grill 10. As the plurality of fixed protrusions 59 are combined with the fixed grooves 18a, the gasket member 50 may be connected to the discharge grill 10 more stably as the gasket member 50 is prevented from moving sideways.

The gasket member 50 maintains close contact not only between the discharge grill 10 and the filter member 30 but also between the discharge grill 10 and the main body 100 of the vacuum cleaner at the same time using discharged air of the main body 100 of the vacuum cleaner to enhance the sealing action of the gasket member 50.

Figure 6:
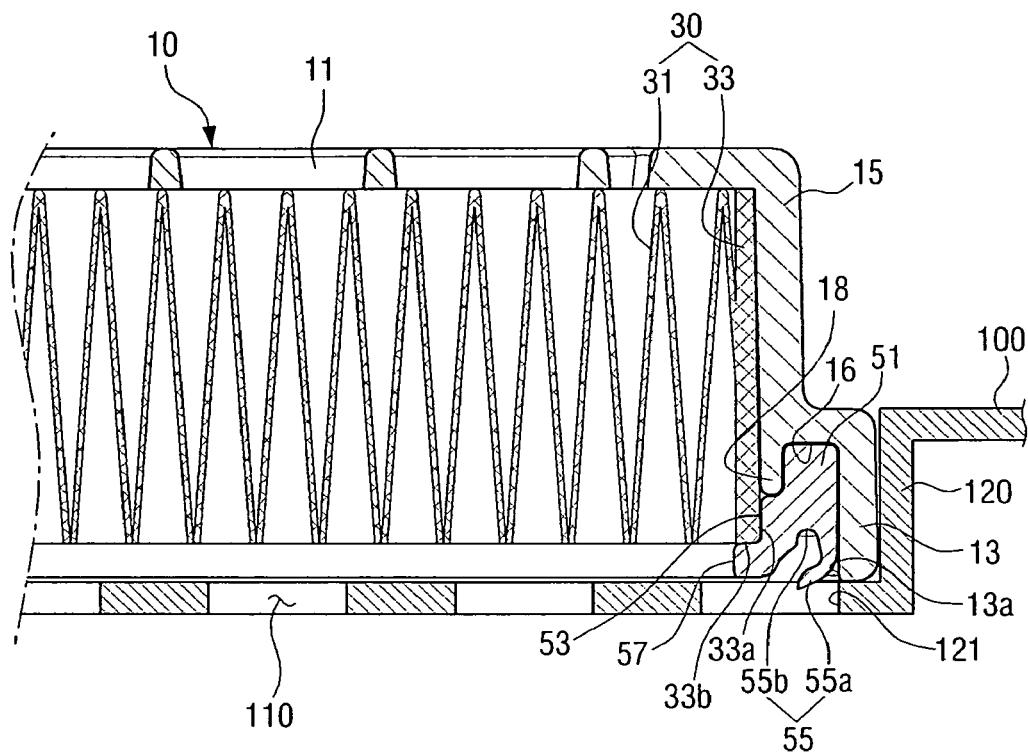
FIGS. 6 and 7 are views illustrating an operation state of a filter assembly for a vacuum cleaner according to an exemplary embodiment of the present disclosure.

As illustrated in FIG. 6, the wing unit 55a of the sealing reinforcement unit 55 remains inclined towards the protrusion unit 57 before air is discharged when the filter assembly 1 is mounted on the mounting unit of the main body 100 of the vacuum cleaner.

Figure 7:
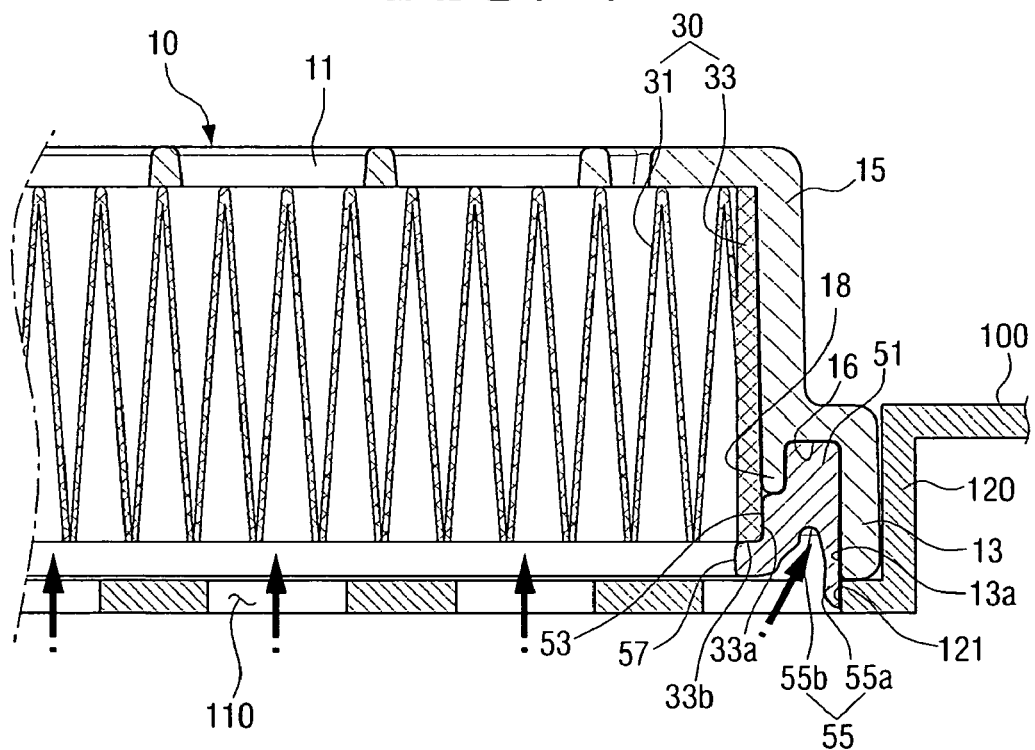

When the vacuum cleaner is operated, air drawn into the vacuum cleaner passes through a dirt bag (not shown) or a cyclone chamber (not shown) and large dirt is separated from the air, and then the air is discharged from the inside the main body 100 of the vacuum cleaner towards the filter assembly 1 as illustrated in FIG. 7. The discharged air penetrates the filter 31 and the plurality of grill holes 11 consecutively via the plurality of discharge holes 110, and is discharged outside the filter assembly 1.

As part of the air penetrating the discharge holes 110 is drawn into the discharge receiving groove 55b of the sealing reinforcement unit 55, discharge pressure of the air is applied on the gasket member 50, pressing the gasket member 50 towards the discharge grill 10 and the filter member 30. Accordingly, the multi-layered contact area 53 and the protrusion unit 57 are tightly contacted to the partition 18 of the discharge grill 10 and one side 33a and end 33b of the filter member 30 so that the discharge grill 10 and the filter member 30 may maintain tight contact with each other. Meanwhile, the wing unit 55a is pushed outwards towards a inside surface 13a of the first outer surface 13 of the discharge grill 10 due to air drawn into the discharge receiving groove 55b, and thus the inside surface 13a of the first outer surface 13 of the discharge grill 10 is closely connected to the part 121 of the main body 100 of the vacuum cleaner so that the discharge grill 10 may maintain close contact with the main body 100 of the vacuum cleaner. Further, wing unit 55a seals a space between the discharge grill 10 and part 121 of the main body 100 of the vacuum cleaner.

According to an exemplary embodiment of the present disclosure, in the filter assembly 1, if the gasket member 50 is pulled in an opposite direction of the discharge grill 10 when the filter member 30 is being replaced, and thus a plurality of combination protrusions 58 are removed from the combined groove 17 of the discharge grill 10, the filter member 30 may be separated from the discharge grill 10 easily.

As in the above description, the present disclosure may form a seal in two spots, not only the filter assembly 1 itself but also the peripherals of the filter assembly 1, at the same time via a single gasket member 50 using air pressure before the air is discharged from the vacuum cleaner.

In addition, since the present disclosure does not have to use adhesives to fix the filter 31 to the discharge grill 10, time for assembling a filter assembly 1 is significantly reduced and production cost is also reduced as the number of parts used is decreased.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A filter assembly of a vacuum cleaner, comprising:
   a discharge grill formed on a discharge passage of a main body of the vacuum cleaner;
   a filter member mounted on the discharge grill;
   a gasket member that is formed between the discharge grill and the filter member and detachable from both the discharge grill and the filter member and seals a space between the discharge grill and the filter member and wherein the gasket member further comprises a sealing reinforcement unit to form a seal between the discharge grill and a part of the main body of the vacuum cleaner contacting the discharge grill; and
   wherein the sealing reinforcement unit presses the gasket member towards the discharge grill and the filter member by receiving discharged air moving towards the discharge grill.

2. The filter assembly as claimed in claim 1, wherein the gasket member and the sealing reinforcement unit are formed of a soft rubber material or a synthetic rubber material.

3. The filter assembly as claimed in claim 1, wherein the sealing reinforcement unit comprises:
   a wing unit extended and formed along one side of the gasket member; and
   a discharge receiving groove formed between the wing unit and the gasket member to receive the discharged air.

4. The filter assembly as claimed in claim 3, wherein the wing unit seals a space between the discharge grill and the main body of the vacuum cleaner.

5. The filter assembly as claimed in claim 1, wherein the filter member comprises:
   a filter unit; and
   a frame unit formed along with outer surface of the filter unit.

6. The filter assembly as claimed in claim 5, wherein the gasket member further comprises:
   an extension unit to cover an end of the frame unit.

7. A filter assembly of a vacuum cleaner, comprising:
   a discharge grill formed on a discharge passage of a main body of the vacuum cleaner;
   a filter member mounted on the discharge grill; and
   a gasket member that is detachably formed between the discharge grill and the filter member and seals a space between the discharge grill and the filter member, wherein the gasket member further comprises:
   a plurality of combination protrusions to be snappingly combined to the discharge grill to sustain the filter member to the discharge grill.

8. The filter assembly as claimed in claim 7, wherein the plurality of combination protrusions protrudes along the outer surface of the gasket member at predetermined intervals, and a plurality of combination grooves to which the plurality of combination protrusions are snappingly combined are formed on the discharge grill.

* * * * *